(12) United States Patent
Carboni

(10) Patent No.: US 8,196,380 B2
(45) Date of Patent: Jun. 12, 2012

(54) MACHINE FOR DECREASING FORCE EXERTED ON MAIZE DURING HARVESTING

(75) Inventor: Lorenzo Carboni, Beinette (IT)

(73) Assignee: Olimac S.R.L., Beinette (Cuneo) (IT)

( * ) Notice: Subject to any disclaimer, the term of this patent is extended or adjusted under 35 U.S.C. 154(b) by 0 days.

(21) Appl. No.: 12/969,276

(22) Filed: Dec. 15, 2010

(65) Prior Publication Data

US 2011/0146218 A1 Jun. 23, 2011

(30) Foreign Application Priority Data

Dec. 18, 2009 (EP) ................................... 09425513

(51) Int. Cl.
*A01D 45/02* (2006.01)
*A01D 45/10* (2006.01)
(52) U.S. Cl. ......................................................... 56/62
(58) Field of Classification Search .............. 56/62, 104, 56/119, 64, 105
See application file for complete search history.

(56) References Cited

U.S. PATENT DOCUMENTS

| | | | | | |
|---|---|---|---|---|---|
| 2,604,749 | A | * | 7/1952 | Fergason | 56/103 |
| 2,618,113 | A | * | 11/1952 | Hyman | 56/104 |
| 3,101,579 | A | * | 8/1963 | Karlsson et al. | 56/105 |
| 3,126,690 | A | * | 3/1964 | Keller et al. | 56/107 |
| 3,262,255 | A | * | 7/1966 | Karlsson et al. | 56/107 |
| 3,271,940 | A | * | 9/1966 | Ashton et al. | 56/105 |
| 3,552,398 | A | * | 1/1971 | Looker et al. | 460/130 |
| RE27,554 | E | * | 1/1973 | Ashton | 56/105 |
| 3,707,833 | A | | 1/1973 | Sutton | |
| 3,858,384 | A | * | 1/1975 | Maiste et al. | 56/14.2 |
| 3,940,913 | A | * | 3/1976 | Wallenfang et al. | 56/98 |
| RE31,064 | E | * | 10/1982 | Shriver | 56/98 |
| 4,845,930 | A | | 7/1989 | Dow | |
| 5,060,464 | A | * | 10/1991 | Caron | 56/62 |
| 5,680,750 | A | * | 10/1997 | Stefl | 56/62 |
| 5,878,559 | A | * | 3/1999 | Cooksey et al. | 56/62 |
| 6,226,969 | B1 | * | 5/2001 | Becker | 56/62 |
| 6,237,312 | B1 | | 5/2001 | Becker | |
| 2011/0173942 | A1 | * | 7/2011 | Kowalchuk | 56/62 |

FOREIGN PATENT DOCUMENTS

EP 1491083 A2 12/2004

OTHER PUBLICATIONS

European Search Report for European application No. 094255130.0 dated Jul. 5, 2010.

\* cited by examiner

*Primary Examiner* — Arpad Fabian-Kovacs
(74) *Attorney, Agent, or Firm* — Patterson & Sheridan, LLP

(57) ABSTRACT

A machine for harvesting maize includes a supporting structure carrying a plurality of harvesting units set alongside one another in a transverse direction. Each harvesting unit includes a framework fixed with respect to the supporting structure and includes two box sections set at a distance from one another in a transverse direction by an empty space elongated in a longitudinal direction and two stripper plates carried by respective box sections. The stripper plate has respective edges facing one another that extend on opposite sides in the empty space, and the facing edges of the stripper plates form a squeezing channel. A pair of counter-rotating traction rollers are arranged underneath the squeezing channel. The stripper plates are mobile in a vertical direction with respect to the respective box sections and are associated to respective spring devices that push the stripper plates elastically towards a raised position.

12 Claims, 5 Drawing Sheets

MACHINE FOR DECREASING FORCE EXERTED ON MAIZE DURING HARVESTING

CROSS-REFERENCE TO RELATED APPLICATIONS

This application claims benefit of European patent application number 09425513.0, filed Dec. 18, 2009, which is herein incorporated by reference.

BACKGROUND OF THE INVENTION

1. Field of the Invention

The present invention relates to a machine for harvesting maize, designed to be applied to the front part of a combine harvester.

2. Description of the Related Art

Machines for harvesting maize of the most widespread type comprise a supporting structure designed to be fixed to the thresher and carrying a plurality of harvesting units set alongside one another in a transverse direction. Each harvesting unit is dedicated to the harvesting of a row of maize plants. Each harvesting unit usually comprises a fixed framework carrying two stripper plates. Said stripper plates have respective edges facing one another that form a squeezing channel for the maize stalks. Each harvesting unit comprises a pair of counter-rotating traction rollers arranged underneath the squeezing channel. The traction rollers grip the maize stalks and draw them downwards, passing the stalks between the facing edges of the stripper plates. The cobs of maize come into contact with the top surfaces of the stripper plates and are detached from the stalks as a result of the stalks being drawn down by the traction rollers. The cobs gather on the top surface of the stripper plates and are conveyed towards the thresher by gathering chains located on top of the stripper plates.

In order to ensure a high productivity, the maize stalks are drawn downwards at a high speed. This leads to a high-speed impact of the cobs against the top surfaces of the stripper plates.

One drawback of this type of machine is that the impact of the cobs on the stripper plates causes a detachment of the grains of maize from the cores of the cobs. This problem becomes particularly sensitive when harvesting very dry maize. On the one hand, the harvesting of dry maize is very advantageous since it avoids a successive drying step after harvesting. On the other hand, in the case of dry maize, the grains detach easily from the core and the impact of the cobs at high speed on the stripper plates leads to a loss of useful crop on account of the removal of the grains from the cobs.

SUMMARY OF THE INVENTION

The object of the present invention is to provide a machine for harvesting maize that will enable reduction of the loss of useful crop due to the removal of the grains from the cobs.

According to the present invention, this object is achieved by a machine wherein the stripper plates are mobile in a vertical direction between a raised position and a lowered position and are associated to respective spring devices that push the stripper plates elastically towards the raised position.

In this way, when a cob comes into contact with the top surfaces of the stripper plates, the plates drop down against the action of the respective spring devices and dampen the impact of the cob on the stripper plates. The detachment of the cobs hence occurs in a gentler way, and the detachment of the grains of maize from the cores of the cobs is reduced considerably.

BRIEF DESCRIPTION OF THE DRAWINGS

The present invention is now described in detail with reference to the annexed drawings, which are provided purely by way of non-limiting example and in which.

DETAILED DESCRIPTION

Figure 1:
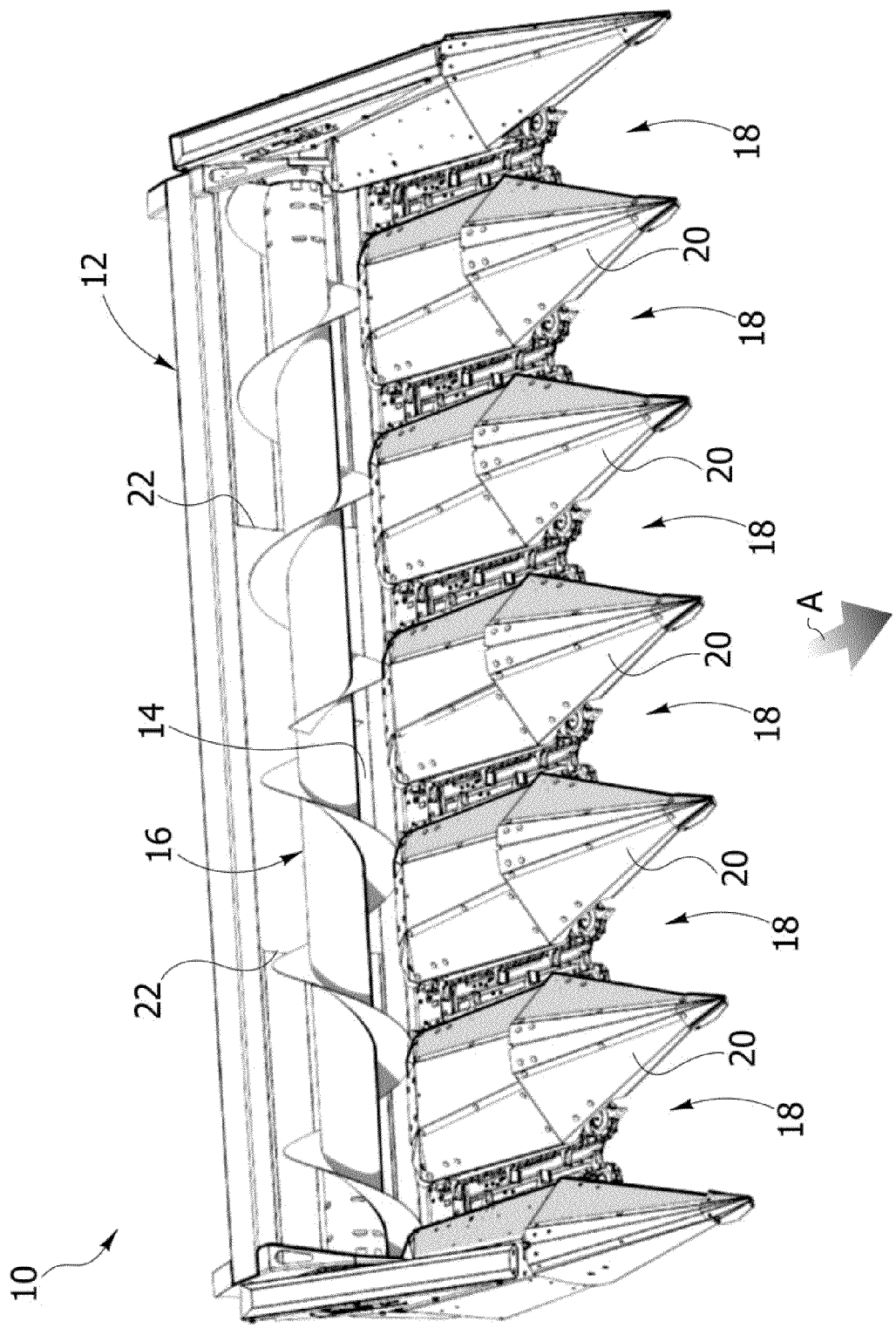
FIG. 1 is a perspective view of a machine for harvesting maize according to the present invention.

With reference to FIG. 1, designated by 10 is a machine for harvesting maize designed to be applied to the front part of a combine harvester for harvesting maize of a conventional type (not illustrated). The machine 10 comprises a supporting structure 12 equipped with means (not illustrated) for connection to the combine harvester. The supporting structure 12 has a transverse conveying channel 14, associated to which is a worm conveyor 16.

The supporting structure 12 carries a plurality of harvesting units 18 set alongside one another in a transverse direction with respect to the direction of advance of the machine 10, indicated by the arrow A in FIG. 1. Separation prongs 20 are arranged between adjacent harvesting units 18. The harvesting units 18 carry out detachment of the cobs from the maize stalks in the way that will be described in what follows. The harvesting units 18 convey the cobs towards the conveying channel 14. The worm conveyor 16 conveys the cobs contained in the conveying channel 14 towards openings 22 of the supporting structure 12, which face respective loading mouths of the combine harvester.

Figure 2:
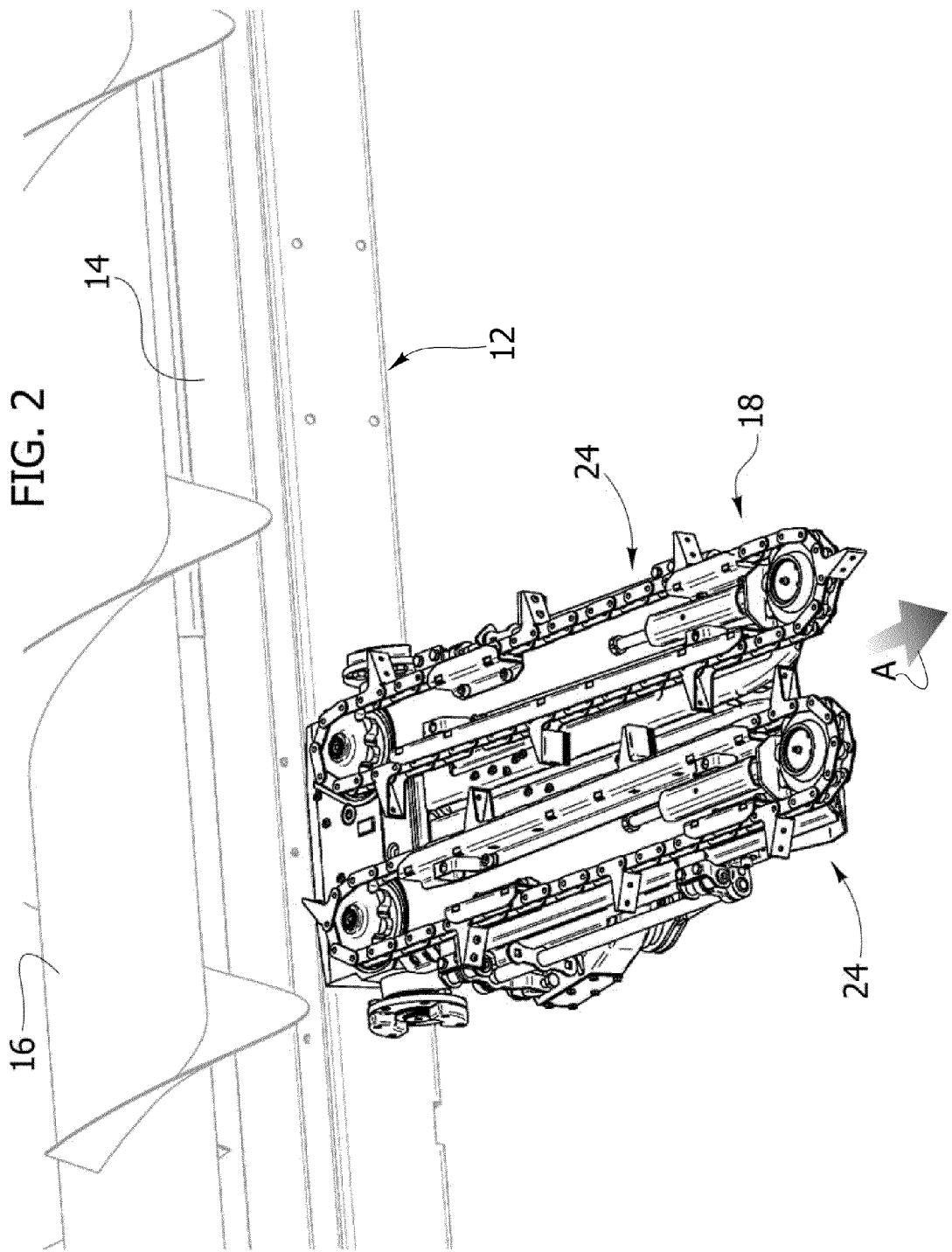
FIG. 2 is a perspective view of a harvesting unit indicated by the arrow II in FIG. 1.

With reference to FIG. 2, each harvesting unit 18 comprises two gathering chains 24 that carry out conveyance of the cobs detached from the stalks towards the conveying channel 14.

Figure 3:
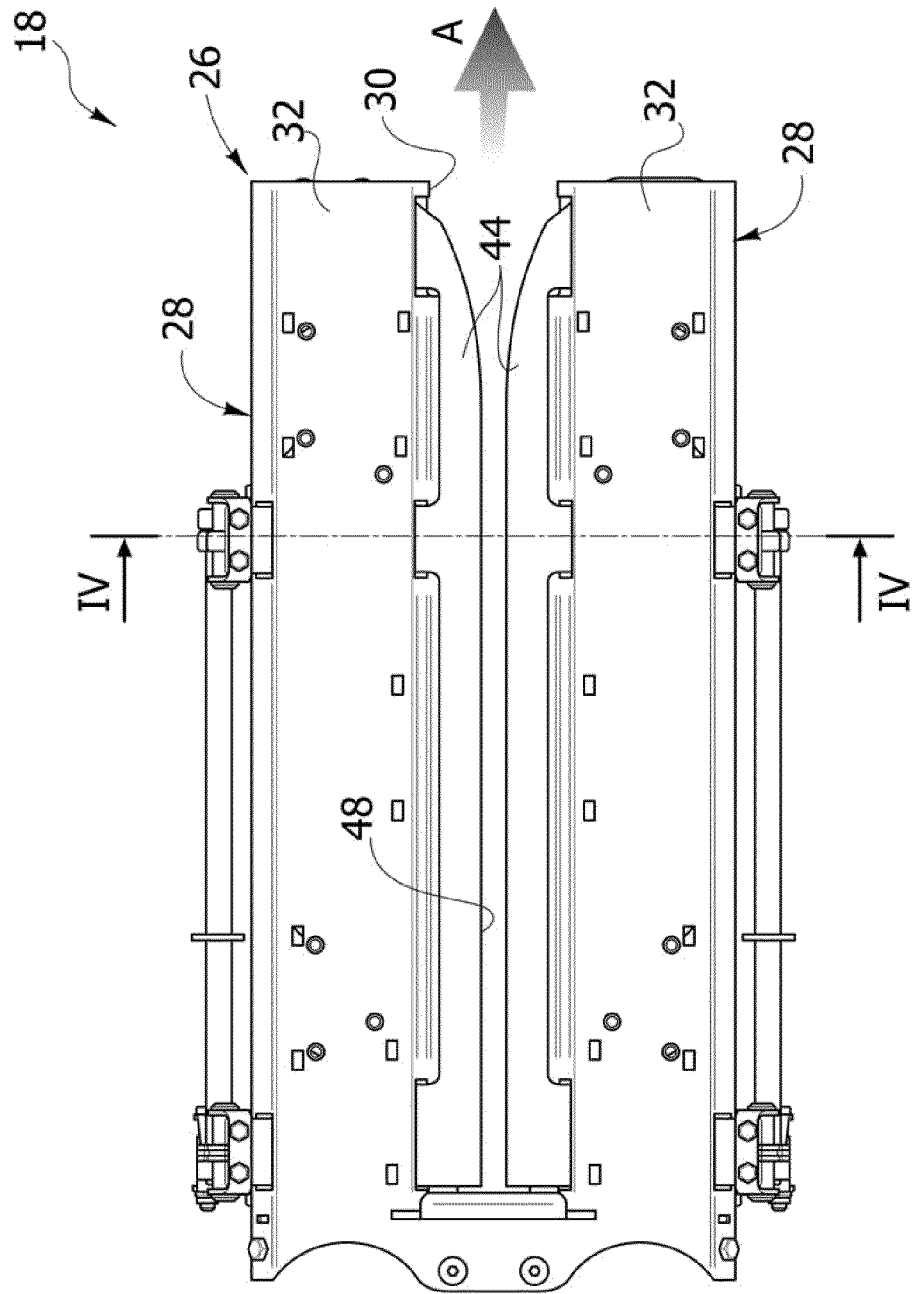
FIG. 3 is a top plan view of the harvesting unit illustrated in FIG. 2, with some components removed for greater clarity.
Figure 4:
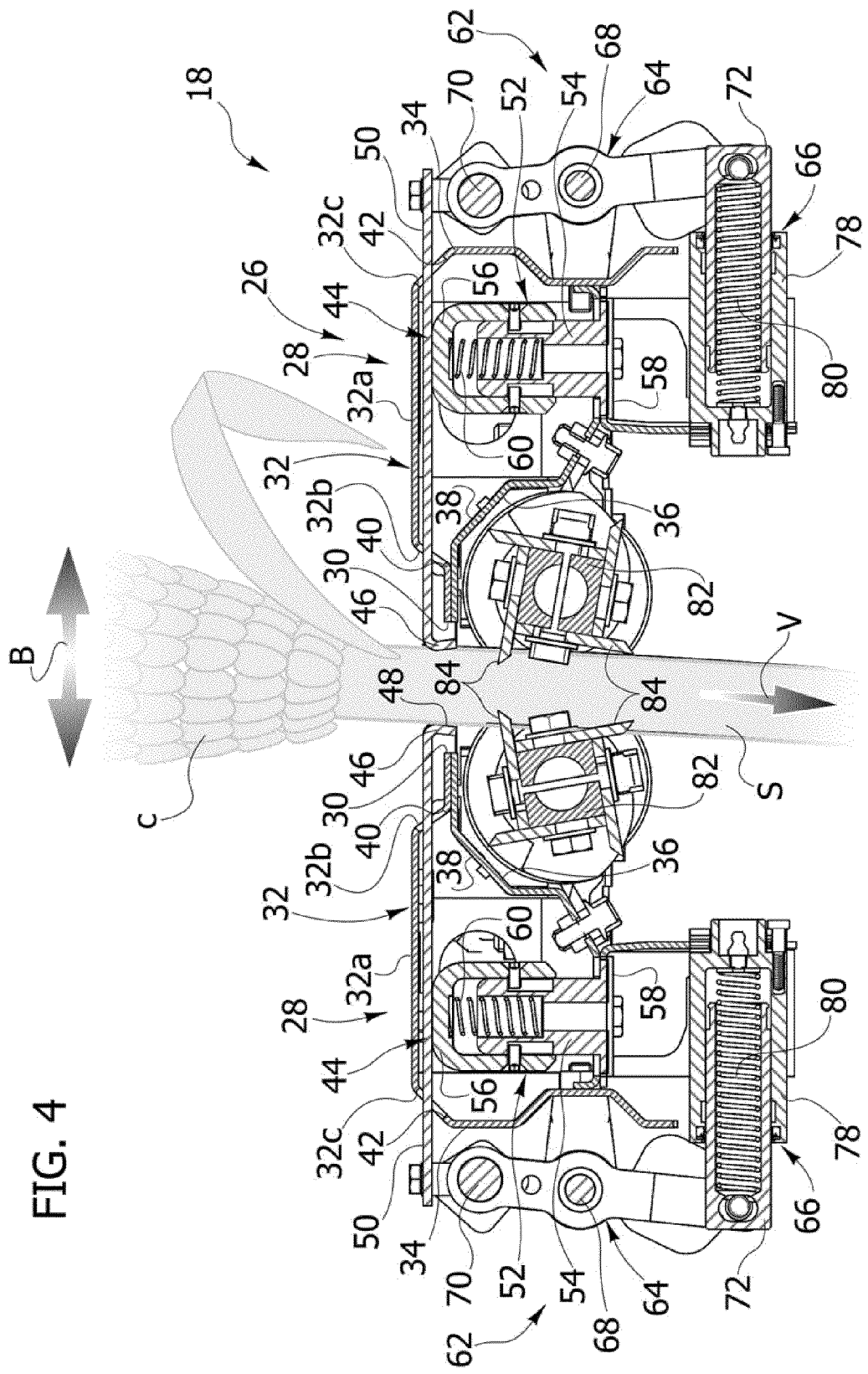
FIGS. 4 and 5 are sections according to the line IV-IV of FIG. 3 in two working conditions.
Figure 5:
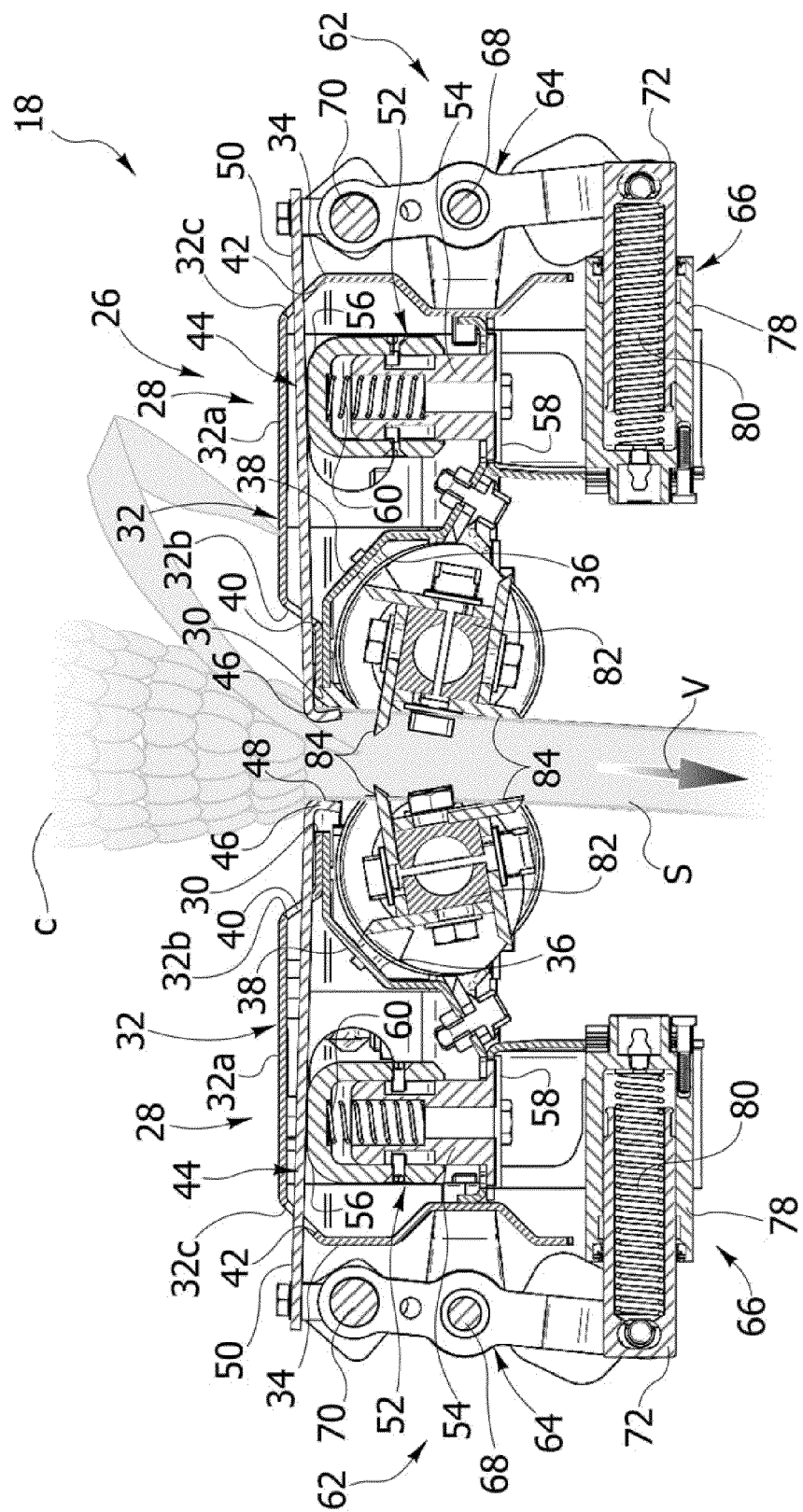

With reference to FIGS. 3 to 5, there now follows a description of how the cobs are detached from the maize stalks. In these figures, the harvesting chains 24 have been removed to facilitate understanding of the drawings.

Each harvesting unit 18 comprises a framework 26 fixed with respect to the supporting structure 12. The framework 26 comprises two box sections 28 preferably made of sheet metal, set at a distance from one another in a transverse direction by an empty space 30 elongated in a longitudinal direction. Each box section 28 has a top wall 32, an outer side wall 34 and an inner side wall 36 that delimit a cavity 38. With reference to FIGS. 4 and 5, the top wall 32 of each box section 28 has a plane horizontal stretch 32a that terminates at its side ends with an inner inclined stretch 32b and an outer inclined stretch 32c. An internal through opening 40 is formed on the inner inclined stretch 32b, and an external through opening 42 is formed in the outer inclined stretch 32c.

Each harvesting unit 18 comprises two stripper plates 44 carried by the respective box sections 28 of the fixed framework 26. The stripper plates 44 have respective edges 46 facing one another that extend on opposite sides in the empty space 30 defined between the box sections 28. The facing edges 46 define a squeezing channel 48. As may be seen in FIG. 3, the squeezing channel 48 is elongated in a longitudinal direction A. Each stripper plate 44 has a central part that extends within the cavity 38 of the respective box section 28 and has a part adjacent to the edge 46 that extends on the outside of the box section 28 through the respective external through opening 40. Each stripper plate 44 has two appendages 50 that extend on the outside of the box section 28 through respective external through openings 42.

Each stripper plate 44 is mobile in a vertical direction with respect to the respective box section 28 between a raised position illustrated in FIG. 4 and a lowered position illustrated in FIG. 5. The top and bottom edges of the internal through openings 40 constitute ends-of-travel that define the raised and lowered positions of the stripper plates 44.

The stripper plates 44 are associated to respective spring devices 52, which push the stripper plates 44 elastically towards the respective raised positions. The spring devices 52 are preferably housed in the cavities 38 of the box sections 28. Each spring device 52 preferably comprises a fixed part 54 and a mobile part 56, which is guided in a vertical direction with respect to the fixed part 54. Preferably, the fixed part 54 is fixed to a horizontal wall 58, which is in turn fixed between the side walls 34, 36 of the respective box section 28. Preferably, the mobile part 56 has the shape of a cup turned upside down that slidably fits on the outer part of the fixed part 54. A spring 60, preferably constituted by a helical spring, is set between the fixed part 54 and the mobile part 56. Each stripper plate 44 rests on the mobile part 56 of one or more elastic devices 52.

The stripper plates 44 are preferably mobile in a transverse direction B to adjust the width of the squeezing channel 48. Preferably, the stripper plates 44 are associated to an automatic adjustment mechanism 62 that automatically adapts the width of the squeezing channel 48 to the size of the maize stalks. The adjustment mechanism 62 comprises, for each stripper plate 44, one or more rockers 64 and one or more elastic devices 66. Each rocker 64 is articulated in a central part thereof to the respective box section 28 via a central pin 68. The top end of each rocker 64 is articulated to a respective appendage 50 of a stripper plate 44 by means of a top pin 70. The bottom end of each rocker 64 is articulated to a mobile element 72 of the elastic device 66. The mobile element 72 is guided in a fixed element 78 and is mobile in a transverse direction. A spring 80 tends to push the mobile element 72 outwards with respect to the fixed element 78. The forces produced by the springs 80 of the elastic devices 66 push the edges 46 of the stripper plates 44 towards one another. The edges 46 press against the maize stalks S inserted in the squeezing channel 48. The stripper plates 44 move in a transverse direction B according to the diameter of the stalks S inserted in the squeezing channel 48. Consequently, the width of the squeezing channel 48 automatically adapts to the diameter of the stalks S.

Each harvesting unit 18 comprises a pair of counter-rotating traction rollers 82 arranged underneath the squeezing channel 48. The traction rollers 82 are able to rotate about respective longitudinal axes parallel to one another and are preferably equipped with blades 84 designed to grip the stalks S that are in the squeezing channel 48. The rotation of the traction rollers 82 causes a traction of the stalks S in the vertical direction indicated by the arrow V in FIGS. 4 and 5.

In operation, the machine 10 advances in the direction indicated by the arrow A in FIGS. 1 to 3. The maize stalks enter the squeezing channel 48 as a result of the advance of the machine 10 in the direction A. The rollers 82 draw the stalks that are in the squeezing channel 48 downwards. The edges 46 of the stripper plates 44 are pressed against the stalks S, so that the width of the squeezing channel 48 is equal to the diameter of the stalks S.

Normally, the stripper plates 44 are in their raised position illustrated in FIG. 4. When a cob C comes into contact with the top surfaces of the stripper plates 44, as illustrated in FIG. 5, the stripper plates 44 shift downwards compressing the spring devices 52. The movement downwards of the stripper plates 44 dampens the impact of the cobs C on the stripper plates. The action of drawing downwards of the stalks S caused by the rotation of the traction rollers 82 causes detachment of the cobs C from the stalks S. The detached cobs remain on the top surface of the stripper plates 44 and are conveyed towards the conveying channel 14 by the harvesting chains 24.

The elastic movement in a vertical direction of the stripper plates 44 reduces the loss of grains of maize due to the impact of the cobs on the top surface of the stripper plates.

The present invention may undergo numerous variations with respect to what has been described and illustrated herein. For example, the elastic devices 52 may be replaced by devices of a different type, for e.g., leaf springs arranged for pushing the stripper plates 44 upwards. The adjustment mechanism 62 that automatically adjusts the width of the squeezing channel 48 is particularly advantageous in so far as it avoids any manual interventions to adjust the width of the squeezing channels 48 of the various harvesting units 18. However, the present invention is applicable also to harvesting units without the automatic adjustment mechanism 62.

While the foregoing is directed to embodiments of the present invention, other and further embodiments of the invention may be devised without departing from the basic scope thereof, and the scope thereof is determined by the claims that follow.

The invention claimed is:

1. A machine for harvesting maize, comprising a supporting structure carrying a plurality of harvesting units set alongside one another in a transverse direction, wherein each harvesting unit comprises:
   a framework fixed with respect to the supporting structure and including two box sections set at a distance from one another in a transverse direction by an empty space elongated in a longitudinal direction;
   two stripper plates carried by respective box sections, the stripper plates having respective edges facing one another that extend on opposite sides in said empty space, the facing edges of said stripper plates forming a squeezing channel; and
   a pair of counter-rotating traction rollers arranged underneath said stripper plates,
   wherein said stripper plates are mobile in a vertical direction with respect to the respective box sections between a raised position and a lowered position and wherein said stripper plates are associated to respective spring devices that push the stripper plates elastically towards said raised position.

2. The machine according to claim 1, wherein each of said stripper plates has a central portion that extends within a cavity of a respective box section and an end stretch adjacent to said edge that extends on the outside of said box section through an internal through opening.

3. The machine according to claim 2, wherein said elastic devices are housed within said cavity of said box section.

4. The machine according to claim 2, wherein each of said stripper plates has at least one appendage, opposite to said edge, which extends on the outside of said box section through an external through opening.

5. The machine according to claim 4, wherein said appendage of said stripper plate is connected to an adjustment mechanism for the adjustment of the width of the squeezing channel.

6. The machine according to claim 5, wherein said adjustment mechanism comprises a rocker articulated in a central area thereof to said framework, said rocker having a first end articulated to said appendage and a second end co-operating with an elastic device.

7. A machine for harvesting maize, comprising a supporting structure carrying a plurality of harvesting units set alongside one another in a transverse direction, wherein each harvesting unit comprises:
- a framework fixed with respect to the supporting structure and including two box sections set at a distance from one another in a transverse direction by an empty space elongated in a longitudinal direction;
- two stripper plates carried by respective box sections, the stripper plates having respective edges facing one another that extend on opposite sides in said empty space, the facing edges of said stripper plates forming a squeezing channel; and
- a pair of counter-rotating traction rollers arranged underneath said stripper plates,
- wherein said stripper plates are mobile in a vertical direction with respect to the respective box sections between a raised position and a lowered position, wherein said stripper plates are associated to respective spring devices that push the stripper plates elastically towards said raised position, and wherein each spring device comprises a fixed part, a mobile part guided in a vertical direction with respect to said fixed part, and a spring set between said fixed part and said mobile part.

8. The machine according to claim 7, wherein each of said stripper plates has a central portion that extends within a cavity of a respective box section and an end stretch adjacent to said edge that extends on the outside of said box section through an internal through opening.

9. The machine according to claim 8, wherein elastic devices are housed within said cavity of said box section.

10. The machine according to claim 8, wherein each of said stripper plates has at least one appendage, opposite to said edge, which extends on the outside of said box section through an external through opening.

11. The machine according to claim 10, wherein said appendage of said stripper plate is connected to an adjustment mechanism for the adjustment of the width of the squeezing channel.

12. The machine according to claim 11, wherein said adjustment mechanism comprises a rocker articulated in a central area thereof to said framework, said rocker having a first end articulated to said appendage and a second end co-operating with an elastic device.

* * * * *